June 26, 1956
S. W. ALDERFER
2,752,279
EMBOSSED LAMINATED FOAM RUBBER AND FABRIC
MATERIAL AND METHOD OF MAKING SAME
Filed Aug. 3, 1954
2 Sheets-Sheet 1
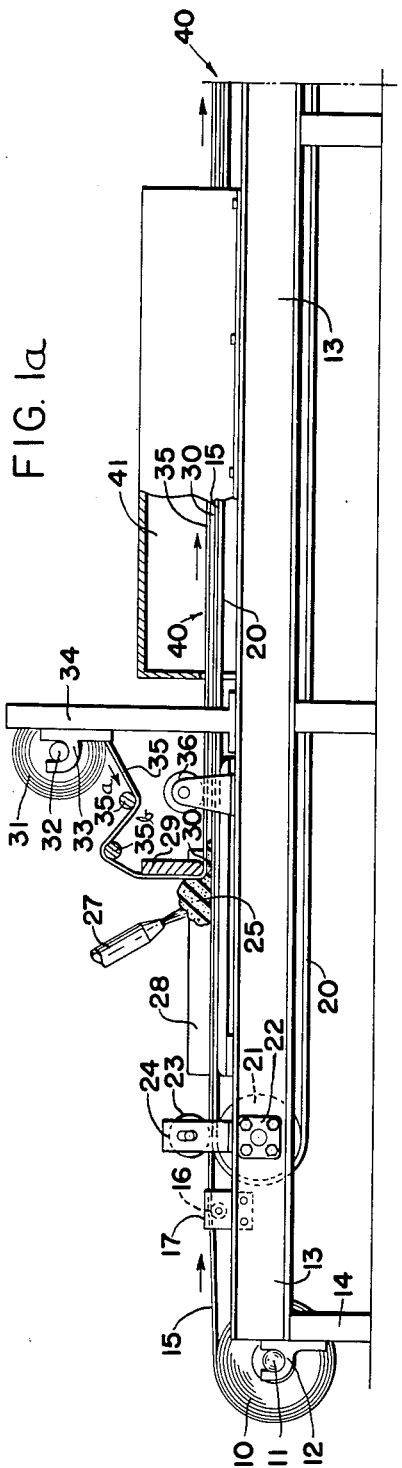
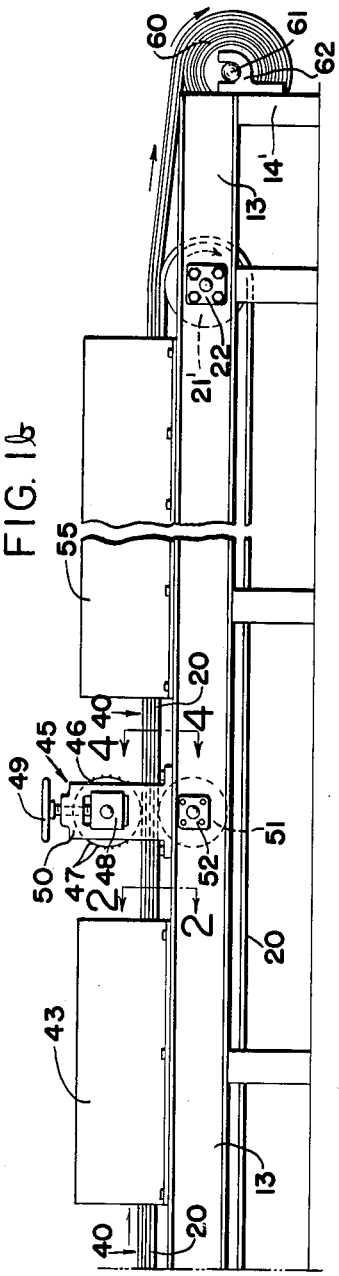
*INVENTOR.*
STERLING W. ALDERFER
BY
*Ely, Luys & Hamilton*
ATTORNEYS

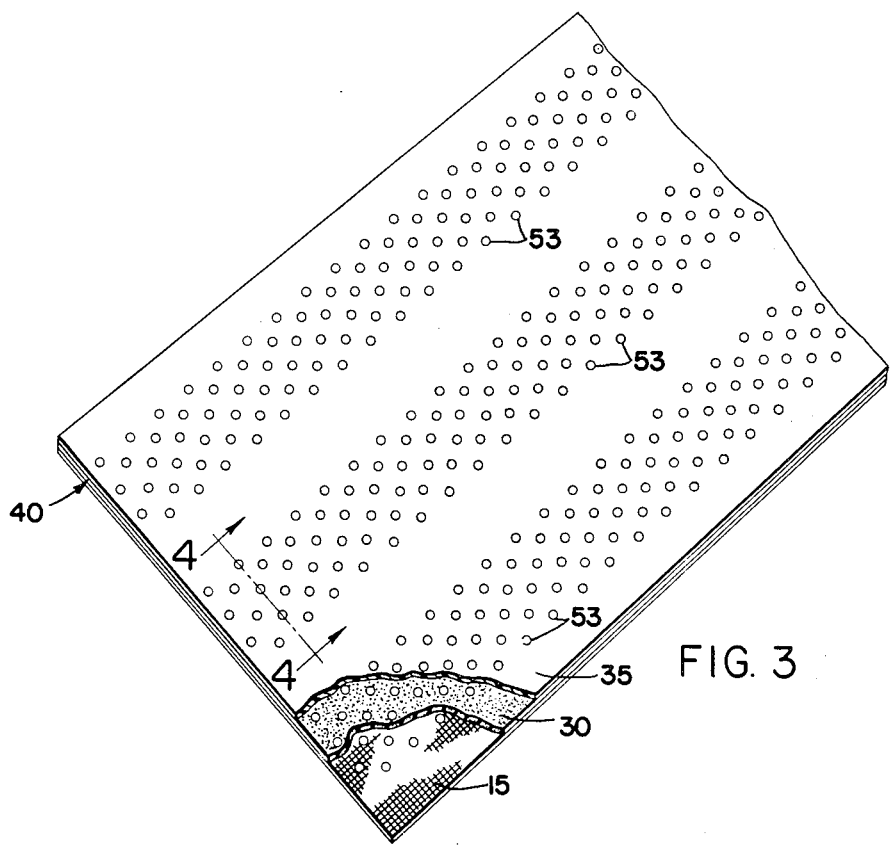
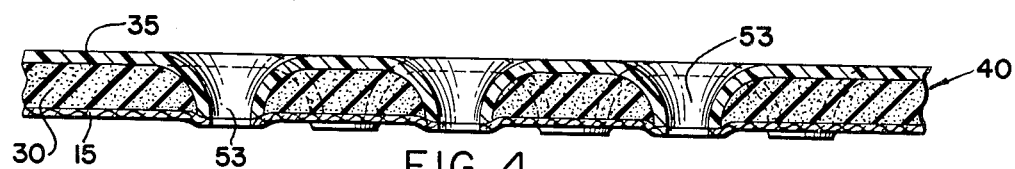
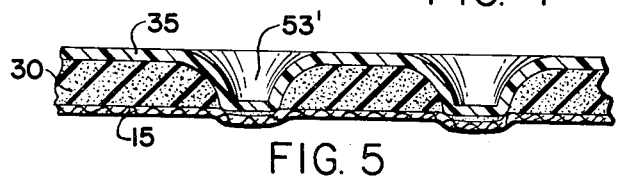

United States Patent Office 2,752,279
Patented June 26, 1956

2,752,279

EMBOSSED LAMINATED FOAM RUBBER AND FABRIC MATERIAL AND METHOD OF MAKING SAME

Sterling W. Alderfer, Akron, Ohio, assignor, by mesne assignments, to The Kendall Company, Walpole, Mass., a corporation of Massachusetts Application August 3, 1954, Serial No. 447,519

11 Claims. (Cl. 154—100)

The present invention relates to a new material having a decorative wear resistant surface and a rubber and fabric backing of substantial thickness. More particularly, the invention relates to a novel laminated composite material having an outer embossed plastic layer, a middle foam rubber layer, and an inner textile fabric layer.

Heretofore, it has not been possible to produce a satisfactory laminated fabric material of the type herein disclosed. Various attempts to do so have been made but have encountered difficulty in producing a lasting deeply embossed contour in the plastic layer, and the adherence of the outer plastic layer to the middle foam rubber layer has not been satisfactory, especially when indentations or perforations in the plastic layer have been embossed into the foam rubber layer.

I have discovered a new and improved method of making a highly decorative and useful laminated fabric material which combines the advantages of an attractively embossed outer surface which is durable, with a backing material which is resilient and flexible, the composite layers of the laminated material in one embodiment having perforations so that the finished product "breathes" and thus may be used for many and varied purposes.

Apparatus and methods for making foam rubber sheeting are disclosed in my prior United States Patent No. 2,628,654, issued February 17, 1953.

It is an object of the present invention generally to provide an improved method of making foam rubber products; and specifically to provide a method of producing a laminated embossed material.

It is a further object of the invention to provide a novel laminated material having a durable embossed plastic outer layer, a resilient foam rubber middle layer, and a flexible and strong textile fabric inner layer.

These and other objects which will appear from the following detailed description are accomplished by the methods and apparatus set forth herein, a preferred embodiment of which is illustrated by way of example in the accompanying drawings. Variation in detail and certain modifications are comprehended within the scope of the appended claims.

In the drawings:

Figs. 1a and 1b are schematic elevational views of an apparatus similar to that shown in my prior Patent No. 2,628,654, with additional equipment necessary to accomplish the method and product of the present invention, Fig. 2 is an enlarged section of the laminated material prior to the perforating operation, as at line 2—2 of Fig. 1b, Fig. 3 is a perspective view of the embossed or perforated composite laminated product with the corner broken away to show the individual layers, Fig. 4 is an enlarged section of the product taken substantially at line 4—4 of Fig. 1b, showing embossed perforations extending through the composite laminated fabric product.

Fig. 5 is a similar view of a slightly different embodiment of the product showing the embossments or indentations compressing the laminations without perforating them.

In Fig. 1a, the numeral 10 represents a roll of reinforcing textile fabric which is preferably applied to the back side of a foam rubber layer to form the inner side of the laminated fabric material, thereby preventing spreading of the rubber during use or handling. As used herein, the term "textile fabric" is understood to cover any suitable material of a structure which will have interstices which are permeable to the passage of air and may be a light muslin or a heavier woven fabric as desired. In certain cases it may be desirable to use a knitted fabric so that the finished material may be stretched if desired.

The roll of fabric is supported on a shaft 11 in brackets 12 affixed to frame structural members 13 and 14. The fabric sheeting 15 is fed over an idler roll 16, supported by brackets 17 affixed to the structural member 13, onto an endless belt 20 which provides a smooth supporting surface upon which foamed latex may be spread, as shown in said prior Patent 2,628,654. The endless belt is driven by rolls 21 and 21' which are affixed to structural member 13 by bearing housings 22. The sheeting is held in contact with the endless belt by hold down roll 23 which is mounted in housings 24 above the drive roll 21.

Shortly after the fabric sheeting 15 reaches the belt 13 and has passed beneath roll 23, a mass of foamed rubber latex 25 is poured over the sheeting from a continuous foaming device (not shown). The foam is spread over the sheeting by a spout 27 which may be moved from side to side of the belt to distribute the foam, which is confined to the belt by the side boards 28.

Preferably, natural rubber latex foam is used, but the terms "foamed latex" or "foam rubber," as used herein, are intended to cover artificial or synthetic foamed materials having properties similar to foamed rubber. The foam may be prepared by adding suitable foaming, gelling and vulcanizing agents, together with stabilizers and antioxidants, to rubber latex and whipping the compound thoroughly to produce a foam of desired intensity, all of which is well known in the art of making foamed latex materials.

The belt 20 carries the mass of foam and the sheeting under a doctor blade 29 which is spaced above the belt and adjustable so as to give the desired thickness to the foamed layer 30. The foam will penetrate the fabric 15 to a sufficient extent to bond itself to the fabric. After the foam and fabric leave the doctor blade the foam will begin to gel or set due to the gelling properties of foamed latex which are well known to those skilled in the art.

The operations thus far described are disclosed in said Patent No. 2,628,654, and per se are not part of the present invention. Before the foamed layer 30 has gelled, an outer or top layer of plastic material is applied as a part of the continuous process. A roll 31 of plastic material is supported on a shaft 32 in brackets 33 affixed to the vertical support members 34. The web of plastic material 35 is preferably fed around idler rolls 35a and 35b and then around the doctor knife 29 into contact with the top surface of the foamed layer as it is leveled off. A pressure roller 36 unites the web of material with the foamed rubber 30 which, as previously described, may have begun to gel but is not yet completely gelled.

The term "plastic material" as used herein is intended to include vinyl type compounds in particular and also, polyethylene and other suitable semi-rigid and thermoplastic materials, with or without inert coloring materials added thereto.

After the plastic material has been applied atop the foamed rubber layer, the composite material, indicated in its entirety by the numeral 40, comprising the fabric sheeting 15, the foamed rubber 30 and the plastic material 35 is run into and through a chamber 41 of sufficient length and at the proper temperature to completely gel or set, but not vulcanize, the foamed rubber layer.

Referring to Fig. 1b, after leaving the setting chamber 41, but before the foam 30 is cured, the composite material 40 is passed into and through another chamber 43 containing a heat source (not shown) which will preferentially heat the plastic material 35, but not cure the foamed rubber layer 30, so that the plastic becomes soft and workable. In the practice of this invention, banks of conventional infrared lamps (not shown) installed in the ceiling of chamber 43 have been found satisfactory for this purpose, though other suitable heat sources could be used.

The plastic material 35 is softened so that the composite material 40 may have a plurality of spaced embossments or embossed perforations made therein by an embossing or perforating device indicated in its entirety by the numeral 45, located so that the composite material leaves the softening chamber 43 and passes beneath a roll 46 having pins or punch buttons 47 arranged on the outer radius thereof in the desired configuration or pattern. The roll 46 is supported in bearing housings 48 which are adjustable as to the depth of embossment by screw down hand wheels 49 which move the bearing housings up and down in support stands 50. Located beneath the roll 46 so as to support the belt 20 and the composite material while it is being contacted by the roll 46, is an idler roll 51 which is affixed to structural member 13 by bearing housings 52. The embossing device 45 is preferably driven by a drive means (not shown) so that its rate of rotation corresponds with the rate at which the endless belt 20 is carrying the composite material 40 through the entire apparatus.

Referring to Figs. 3 and 4, passages of the composite material 40 through the embossing device 45 embosses or indents the plastic material 35 into the uncured foam 30, compressing the foam around the indentations, and punches holes 53 through the plastic material 35, foam 30 and preferably in the fabric sheeting 15 in a pattern complementary with the configuration of the punch dies 47 on roll 46. It will be understood, that the invention is not to be limited to the perforation pattern shown in Fig. 3 but that other patterns may be produced by merely substituting other pin or punch buttons 47 or by changing the pattern of arrangement on the perforating rolls 46.

As shown in Fig. 5, the embossing roll may be adjusted so that the pins 47 do not perforate any of the laminations but form deep embossments or indentations 53' in the plastic material 35, compressing the foam around said indentations.

Referring to Fig. 1b, after passing beyond the embossing device 45, the embossed composite material is passed into and through a curing or vulcanizing chamber 55 in which hot air is circulated, the air being heated to the desired curing temperature by suitable means (not shown). While within chamber 55, the foam rubber layer is completely cured, the plastic layer 35 and the foam rubber layer 30 retaining the indented or embossed shape as shown in Fig. 4 resulting from contact with the embossing device 45.

After being vulcanized, the finished product is recoiled into roll 60 which is supported on shaft 61 in brackets 62 affixed to frame structural members 13 and 14'.

The novel product of the present invention has an attractively embossed durable outer surface with a soft yielding cushion or filler intimately bonded thereto, and having a fabric backing. The bond between the layers insures permanency of the embossed pattern and when the embossments perforate the plastic layer, the perforations permit the fabric to breathe. The product is therefore particularly suited for upholstery, household, office and transportation uses.

While there has been shown and described herein a preferred embodiment of the product, method and apparatus of the invention, it will be obvious to those skilled in the art that modifications are possible and therefore such modifications are within the scope of the claims.

What is claimed is:

1. The method of making a laminated embossed material having composite layers comprising the steps of flowing a mass of foamed latex onto a fabric sheeting carried on a moving belt, leveling off the mass on the belt to form a layer of uniform thickness, and applying atop the layer of foamed latex an additional layer of plastic material, gelling said foamed latex layer, softening said plastic layer, deeply embossing said plastic layer into said foamed layer at spaced locations to form a pattern, and vulcanizing the foamed latex layer.

2. The method of making a laminated perforated material having composite layers of a textile fabric, a foamed latex and a semi-rigid thermoplastic material, comprising the steps of flowing a mass of foamed latex onto textile fabric sheeting carried on a moving belt, leveling off the mass on the belt to form a layer of uniform thickness and applying atop the layer of foamed latex an additional layer of plastic material, gelling said foamed latex layer, heating said pastic material to soften it, embossing said plastic layer into said foamed layer to form perforations through said three composite layers, and vulcanizing the foamed latex layer.

3. The method of making a laminated perforated material having composite layers of a textile fabric, a foamed latex and a semi-rigid thermoplastic material, comprising the steps of flowing a mass of foamed latex onto textile fabric sheeting carried on a moving belt, leveling off the mass on the belt to form a layer of uniform thickness and applying atop the layer of foamed latex an additional layer of plastic material, gelling said foamed latex layer, heating said plastic material to soften it, perforating said plastic layer and foamed layer at spaced locations by indenting said plastic layer into said foamed layer to form an embossed pattern, and vulcanizing the foamed latex layer.

4. In a method of making a laminated perforated material, the steps of applying to a sheeting of partially gelled unvulcanized foamed latex having a fabric backing a layer of a wear resistant semi-rigid thermoplastic material, gelling said foamed latex, softening said plastic material by heating, perforating said laminated fabric material at spaced locations to form a pattern, and vulcanizing said foamed latex.

5. In a method of making laminated perforated material, the steps of forming a layer of foamed latex on a fabric backing, applying a layer of semi-rigid thermoplastic material atop said foamed latex layer, gelling said foamed latex layer, softening said plastic layer, embossing the assembled composite layers, to form perforations therethrough, and vulcanizing said foamed latex layer.

6. In a method of making laminated perforated material, the steps of applying to a sheeting of unvulcanized foamed latex, having a backing layer of reinforcing fabric material attached to its reverse side, a layer of semi-rigid thermoplastic material, gelling said foamed latex, softening said plastic material, embossing said plastic material into said foamed layer at spaced locations to form perforations in said plastic layer, and vulcanizing said foamed latex layer.

7. The method of making a laminated embossed material having as composite layers, textile fabric, foam rubber, and vinyl plastic, comprising the steps of flowing a mass of the foam rubber onto a sheeting of the fabric which is carried on a moving belt, leveling off the mass on the belt to form a layer of uniform thickness and applying atop the layer of foam rubber a layer of vinyl plastic, gelling said foam rubber layer, softening said vinyl plastic layer, embossing said plastic layer into said foam rubber layer at spaced locations, and vulcanizing the foam rubber layer.

8. In a method of making a laminated embossed material, the steps of forming a layer of foamed latex on a fabric backing, applying a layer of semi-rigid thermoplastic material atop the foamed layer, gelling said foamed latex layer, softening said plastic layer, deeply embossing said plastic layer into said foamed layer and vulcanizing said foamed layer.

9. A laminated perforated material having a foamed latex layer on a fabric backing and a plastic layer bonded to said foamed latex layer, said plastic layer being embossed into said foamed layer at spaced locations to form a pattern, and said plastic layer being perforated at the bottom of said embossments.

10. A laminated perforated material having a foamed latex layer on a fabric backing and a plastic layer on the foamed latex layer, said plastic layer being indented into said foamed layer at spaced locations to form an embossed pattern, said material having perforations at the bottom of said indentations, and said plastic layer being permanently bonded to said foamed layer around the indentations.

11. A laminated perforated material having a foamed latex layer on a fabric backing and a plastic layer on the foamed latex layer, said plastic layer being indented into said foamed layer at spaced locations to form an embossed pattern.

References Cited in the file of this patent

UNITED STATES PATENTS

| | | |
|---|---|---|
| 2,434,527 | Untiedt | Jan. 13, 1948 |
| 2,621,139 | Messing | Dec. 9, 1952 |